US012543740B2

(12) United States Patent
Boza Troncoso et al.

(10) Patent No.: US 12,543,740 B2
(45) Date of Patent: Feb. 10, 2026

(54) MICELLAR DISINFECTANTS

(71) Applicant: DENT4YOU AG

(72) Inventors: Americo C. Boza Troncoso, Ontario (CA); Edgar Joel Acosta Zara, Ontario (CA); Dorin Cioraca, Ontario (CA)

( * ) Notice: Subject to any disclaimer, the term of this patent is extended or adjusted under 35 U.S.C. 154(b) by 604 days.

(21) Appl. No.: 17/802,819

(22) PCT Filed: Feb. 26, 2021

(86) PCT No.: PCT/IB2021/051647
§ 371 (c)(1),
(2) Date: Aug. 26, 2022

(87) PCT Pub. No.: WO2021/171263
PCT Pub. Date: Sep. 2, 2021

(65) Prior Publication Data
US 2023/0146954 A1    May 11, 2023

Related U.S. Application Data (60) Provisional application No. 62/983,283, filed on Feb. 28, 2020.

(51) Int. Cl.
| | | |
|---|---|---|
| A01N 59/00 | (2006.01) | |
| A01N 25/04 | (2006.01) | |
| A01N 25/30 | (2006.01) | |
| A01N 31/14 | (2006.01) | |
| A01N 37/10 | (2006.01) | |
| A01P 1/00 | (2006.01) | |
| A01P 3/00 | (2006.01) | |
| A61K 9/00 | (2006.01) | |
| A61K 9/107 | (2006.01) | |
| A61K 33/40 | (2006.01) | |
| A61K 47/24 | (2006.01) | |
| A61P 31/02 | (2006.01) | |

(52) U.S. Cl.
CPC ............. *A01N 59/00* (2013.01); *A01N 25/04* (2013.01); *A01N 25/30* (2013.01); *A01N 31/14* (2013.01); *A01N 37/10* (2013.01); *A01P 1/00* (2021.08); *A01P 3/00* (2021.08); *A61K 9/0063* (2013.01); *A61K 9/1075* (2013.01); *A61K 33/40* (2013.01); *A61K 47/24* (2013.01); *A61P 31/02* (2018.01)

(58) Field of Classification Search
None
See application file for complete search history.

(56) References Cited

U.S. PATENT DOCUMENTS

| | | |
|---|---|---|
| 4,414,127 A | 11/1983 | Fu |
| 4,613,452 A | 9/1986 | Sanderson |
| 7,910,647 B2 | 3/2011 | Weide et al. |
| 9,017,652 B1 | 4/2015 | Askar et al. |
| 9,732,071 B2 | 8/2017 | Patron et al. |
| 10,543,195 B2 | 1/2020 | Dreher |
| 2009/0304608 A1 | 12/2009 | Cueman et al. |
| 2013/0224125 A1 | 8/2013 | Kolazi et al. |
| 2016/0074549 A1 | 3/2016 | Lei et al. |
| 2017/0020794 A1 | 1/2017 | Bauer et al. |
| 2017/0172892 A1 | 6/2017 | Dai et al. |
| 2018/0235231 A1 | 8/2018 | Ahmadpour et al. |
| 2019/0008747 A1 | 1/2019 | Shibuya et al. |
| 2019/0112562 A1 | 4/2019 | Yannone et al. |
| 2019/0151493 A1 | 5/2019 | Mori et al. |
| 2019/0203156 A1 | 7/2019 | Man et al. |
| 2019/0224099 A1 | 7/2019 | Gauczinski et al. |
| 2019/0284152 A1 | 9/2019 | Di Biase et al. |
| 2019/0284541 A1 | 9/2019 | Malten et al. |
| 2023/0146954 A1 | 5/2023 | Boza Troncoso et al. |

FOREIGN PATENT DOCUMENTS

| | | |
|---|---|---|
| AU | 2021/225492 A1 | 2/2021 |
| CN | 106265087 A | 1/2017 |
| EP | 3536383 A1 | 9/2019 |
| EP | 4110055 A1 | 2/2021 |
| JP | 2013079219 | 5/2013 |
| WO | WO9837762 A1 | 9/1998 |
| WO | WO 2004/045281 A2 | 6/2004 |
| WO | WO 2010/037219 A1 | 4/2010 |
| WO | WO 2017/112425 A1 | 6/2017 |
| WO | WO2017/210188 A1 | 12/2017 |
| WO | WO 2021/171263 A1 | 9/2021 |

OTHER PUBLICATIONS

L. Setti et al., Superactivity of Peroxidase Solubilized in Reversed Micellar Systems, Applied Biochemistry and Biotechnology, 1995, pp. 207-218, vol. 55, Humana Press 1995. (12 pages).
Mohamaddi et al., Antimicrobial Efficacy of Chlorhexidine as a Root Canal Irrigant: A Literature Review, Journal of Oral Science, No. 2, 2014, pp. 99-103, vol. 56. (5 pages).
H. Martin and P. Maris, Synergism Between Hydrogen Peroxide and Seventeen Acids Against Six Bacterial Strains, Journal of Applied Microbiology, 2012, pp. 578-590, vol. 113,The Society for Applied Microbiology, ANSES Fougères Laboratories 2012. (13 pages).
English Machine Translation of CN106265087A, Patent Translate Powered by EPO and Google. (13 Pages).
International Preliminary Report on Patentability for International Application No. PCT.IB2021/051647 dated Aug. 30, 2022 (11 pages).
International Search Report dated May 31, 2021 (4 pages).
Canadian Examiner's Report and Search Report in corresponding (Continued)

*Primary Examiner* — Alton N Pryor
(74) *Attorney, Agent, or Firm* — Watts Law, LLC; Samantha R. Smart (57) ABSTRACT

The present disclosure relates to micellar compositions conformed by biomimetic phospholipids and nonionic surfactants, among other ingredients, for eliminating one or more types of microorganisms including mycobacteria, bacteria, fungi, and viruses from a surface within a contact time on the surface of less than about 1 minutes and having pH of from about 0.3 to 8. The present invention aims on using 100% bio-based (renewable) biodegradable, non-toxic ingredients to be applied not only to hard inanimate surfaces but also on tissue for endodontic applications.

19 Claims, 5 Drawing Sheets

(56) References Cited

OTHER PUBLICATIONS anadian application No. 3,169,724. (8 pages).
Japanese Office Action in corresponding Japanese application No. 2022-552319, issued Feb. 13, 2024. (2 pages).
English translation of Office Action in Japanese application No. 2022-552319. (1 page).
Second Chinese Office Action in corresponding Chinese application No. 2021800178587 issued Mar. 15, 2024. (11 pages).
English translation of Second Chinese Office Action in corresponding Chinese application No. 2021800178587. (5 pages).
Office Action translation for application No. JP 2022-552319, mailed Oct. 3, 2023 ( 3 pages)
Office Action for JP 2022-552319, mailed Oct. 3, 2023 (3 pages).
Chinese Examiner's Report dated Jul. 6, 2023, issued in counterpart Chinese Application No. 2021800178587 with English translation.
European Opinion dated Jan. 4, 2025 for EP Application No. 21710581.6-1102 (8 pages).

MICELLAR DISINFECTANTS

CROSS REFERENCES TO RELATED APPLICATION

The present application is a 35 U.S.C. § 371 National Stage Patent Application claiming priority to International PCT Application Serial No. PCT/IB20/051647 having an international filing date of 26 Feb. 2021 and that was published on 2 Sep. 2021 under international publication number WO 2021/171263, which claims priority to U.S. Patent Application Ser. No. 62/983,283 that was filed on 28 Feb. 2020. All of the above-identified applications and publication from which priority is claimed are incorporate herein by reference in their entireties for all purposes.

TECHNICAL FIELD

The present invention relates to stable micellar disinfectants. In aspects, the present invention relates to non-corrosive stable micellar disinfectants containing skin-friendly additives having short tuberculocidal, virucidal, fungicidal and/or bactericidal efficacy contact times.

BACKGROUND

About 36% of human diseases have bacterial origin, 33% viral, 6% fungal and 25 parasitic. Since antiviral drugs may not cure all viral diseases, this prompted in situ prevention of disease through disinfection. Disinfection initiated around 1676 with the work of Leeumenhoek and more than 250 active ingredients have been reported only in the European Union. However, only about a 100 of these active ingredients are in frequent use. In specific applications, physical and chemical properties limit their use. Stringent regulatory requirements also limit their quantity or ultimately their use due to toxicity or persistence in the environment. In addition, current requirements demand that disinfectants have a good shelf life, broad spectrum biocide activity, compatibility and short contact times.

Liquid disinfectants typically consist of molecular and hydrotropic solutions. Molecular solutions are mixtures of components in liquid phase where each molecule moves freely and unassociated in the liquid, for example concentrated alcohol solutions. Hydrotropic solutions may contain a mixture of acids, alcohols, and surface-active components named hydrotropes.

Among the most used commercial disinfectants are those based on the so-called quaternary ammonium compounds (QUACs), halogen releasing compounds, aldehydes, alkyl alcohols, phenols, peroxygens, biguanides, diamidines, etc. However, typical active ingredients, used in formulations, need to be present in high concentrations to be effective against difficult to kill or deactivate microorganisms, such as Mycobacteria in reasonable contact times.

For example, it is known that commercial disinfectants which contain hydrogen peroxide at concentrations higher than 3% for hydrogen peroxide tend to be corrosive and irritant. Aldehyde-free compositions comprise of 10 to 20% QUACs, 5 to 15% phenoxy alcohols, and 3 to 10% aminoalkylglycines, all by weight. If aldehyde-based, a typical disinfectant consists of 5 to 15% glutaraldehyde, 7 to 11% formaldehyde and QUACs still in an amount of 2 to 6%. Alkyl alcohol-based formulations also typically contain high alcohol concentrations to be effective. It has been observed that as the solubility of molecules decreases, their biocidal efficacy increases. E.g. Parabens (alkyl para-phenol derivatives), phenol derivatives and cool tar chemicals. Triclosan, a well-known disinfecting chemical is also practically insoluble. Due to this inconvenience, they may be may unsuitable for using them in the formulation of intermediate and high level disinfectants.

Disinfectants must meet safety requirements as their frequent use leaves residues in the environment causing environmental and health concerns. Based on surfaces use, they are typified as noncritical, semi critical and critical depending on their contact frequency with skin or mucous membranes. Studies show that biocides based on sodium hypochlorite, QUACs, chlorine gas and glutaraldehyde were responsible for the highest number of occupational health illnesses.

Contact dermatitis is also a major concern that is likely to be caused by anionic surfactants present in known commercially available disinfectants.

To reduce such chemical amounts, mixtures of chemicals with antibiotics have been devised for disinfectant formulations. However, with the frequent use of antibiotics and disinfectants, for decades, it is now well documented that microorganisms have developed resistance. This acquired resistance, by mutation, possesses additional disinfection challenges to the existent intrinsic resistance of some microorganisms. Tuberculosis (TB) is one of these cases, which have had outbreak came backs with multidrug resistant strains. TB is attributed to be one of the top 10 causes of death worldwide, which took into its account about 1.6 million deaths in 2017. *Candida* Auris is also an emerging fungal pathogen of current concern that has spread almost all over the world being also multidrug and disinfectant resistant. To prevent or delay bacterial resistance, in vivo treatments consist in using combined therapies. In the disinfection of health care facilities, it is virtually obligatory to rotate disinfectants over periods of time.

Currently known disinfection technologies for medical applications comprise accelerated hydrogen peroxide (AHP) which may include peracetic acid+hydrogen peroxide, glutaraldehyde, hydrogen peroxide, peracetic acid, ortho-phthaladehyde, and 2% activated hydrogen peroxide. Disadvantages of AHP concerns about material (substrate) compatibility, including corrosion, and that the formulation might not be capable of penetrating certain organic materials, limiting the access to certain microorganisms.

Current commercial accelerated hydrogen peroxide (AHP) technology uses diluted hydrogen peroxide solution (0.5 to 2%) combined with salts of phosphoric/phosphonic acid and anionic surfactant of the type alkyl-aryl sulfonates.

However, surfactants like sodium dodecyl sulfate and even nonionic ethoxylate surfactants like those used in current AHP formulas can soften the structure of the entire cell membrane, which could lead to skin irritation effects with prolonged exposure. Alkyl aryl sulfonates, for example, have been found to be mildly irritant when residues are left on the skin, needing special formulation to prevent irritation effects. QUACs, active biocides and surface-active ingredients, have also been reported to damage or irritate the skin.

Some commercial disinfectants contain hydrogen peroxide at concentrations at 2% with other components including, peracetic acid+hydrogen peroxide, glutaraldehyde, ortho-phthaladehyde, but there are concerns about material (substrate) compatibility, including corrosion, and that such formulations might not be capable of disrupting membrane cell or cell wall of certain microorganisms. Most of these technologies use anionic surfactants, known to cause skin irritation.

The challenge for most disinfectants is to achieve a high degree of reduction in the number of microorganisms (and towards a wide range of microorganisms) after a short contact time between the disinfectant and the substrate, using formulations that are relatively mild for the user, that can be stable over time and that are not corrosive towards the substrate that are exposed to the formulation. The challenges of disinfection are different from those of preservatives, where contact time is not an issue, because a preservative is meant to be in continuous contact with the material protected to avoid any potential growth of microorganisms.

Accordingly, there is a need to provide skin-friendly non-corrosive stable micellar disinfectants having short tuberculocidal, virucidal, fungicidal and bactericidal efficacy and decreased contact times.

Root canal treatment is normally required whenever tissues in root canals are injured or infected. Prevention or elimination of infection by microorganisms, such as bacteria, and/or bacterial products such as endotoxins, is desired to ensure success of root canal treatment. As well, can bacteria destroy soft tissues occupying inner space of teeth and can also leak out of root into surrounding bone. The root canal treatment is effectuated by removing bacteria and organic matter from the root canal and then filling the space in order to prevent bacterial invasion and irritation to surrounding tissues.

Root canal treatment requires the use of endodontic irrigants which are delivered into the root-canal space to remove tissues, debris, and/or microorganisms from the root canal area. Accordingly, a desirable endodontic irrigant should have suitable mechanical properties to remove unwanted tissues and debris and suitable biological/chemical activity to prevent or eliminate microorganism infection.

Known endodontic irrigants rely on the use of high concentrations of actives. Known solutions are not optimal since they do not address the need for compositions that have both suitable mechanical properties and suitable biological/chemical activity. While sodium hypochlorite is commonly used in endodontic irrigants, it can be undesirable because of its associated toxicity when inadvertently delivered on tissue or when it escapes a treatment area. Endodontic irrigant's role is to prevent or eliminate infection in the root canal, for which, they should have chemical, mechanical, and biological activity. These three requirements cannot be fulfilled by irrigant solutions currently utilized, which are based on high actives concentration. E.g. Sodium hypochlorite, EDTA, Chlorhexidine, citric acid, and others. Sodium hypochlorite remains the most commonly used endodontic irrigant, accounting for about 91% of the use share. However, Sodium hypochlorite has drawbacks associated with its toxicity that produce severe effects on living tissue when inadvertently delivered on tissue or when the fluid escapes the treatment area. Consequently, there is need for biocompatible irrigants able to achieve optimal irrigation activity requirements: chemical, mechanical, and biological. More specifically, these three properties give the irrigant the ability to dissolve necrotic tissue, have the capacity to remove unwanted tissues and debris, have broad spectrum antimicrobial properties within a clinically relevant timeframe and be of low toxicity.

SUMMARY OF THE INVENTION

The present disclosure relates to micellar compositions comprising biomimetic phospholipids and nonionic surfactants, and optionally among other components, for eliminating one or more types of microorganisms including mycobacteria, bacteria, fungi, and viruses from a surface within a contact time on the surface of less than about 1 minutes and having pH of from about 0.3 to 8, In one aspect, the present invention comprises 100% bio-based (renewable) biodegradable, non-toxic ingredients to be applied not only to hard inanimate surfaces, but also on tissue for endodontic applications.

It is an embodiment of the present invention to provide disinfectants comprising isotropic aqueous phospholipid-based micellar compositions, with the capacity to solubilize poorly soluble disinfecting agents. In one embodiment, the compositions comprise micellar solutions formulated to carry very slightly soluble (0.1-1 mg/ml), and or slightly soluble (1-10 mg/ml) and/or sparingly soluble (10-33 mg/ml) components. In another embodiment, the very slightly soluble, and/or slightly soluble and/or sparingly soluble components in combination with soluble (33-100 mg/ml) and/or freely soluble (100-1000 mg/ml) components act synergistically in the disinfection process.

It is an embodiment of the present invention to provide disinfecting liquid micellar compositions, for hard surfaces, comprising phospholipid surfactants and a nonionic surfactant such as polyglyceryl esters of fatty acids or an alkyl (C8 to C18) ethoxylate (4 to 16) surfactant or their polydisperse mixture, or alkylpolysaccharides such as D-Glucopyranose, oligomeric, decyl-octyl glycoside or polyoxyethylene derivatives of sorbitan esters such as POE (20) sorbitan monopalmitate or POE (20) sorbitan monooleate, able to carry very slightly soluble, slightly soluble and/or sparingly soluble ingredients, and hydrogen peroxide in concentrations ranging from 0.05 to 2.5 w/w % of the total weight of the micellar compositions.

It is an embodiment of the present invention to provide a combination of hydrophobic components. In some aspects, hydrophobic components in the formulation are maintained at concentrations sufficient to produce thermodynamically stable clear isotropic micellar solution of oil in water, around the micelle's maximum solubilization capacity to produce maximum biocide efficacy. In some aspects, the hydrophobic components are intended to function as anticorrosive and/or synergistic biocides. In a preferred embodiment, the components can include aspartic acid (anticorrosive), benzotriazole (anticorrosive), benzoic acid (synergistic biocide), hydroxy alkyl phenyl ether (synergistic biocide) or combinations thereof.

It is an embodiment of the present invention to provide micellar systems, containing skin-friendly additives and ingredients used in the food industry with low hydrogen peroxide concentration, less than 3%, that can produce fast, 1-minute, virucidal, bactericidal, tuberculocidal (*M. terrae*) and fungicidal efficacy.

It is an embodiment of the present invention to provide oil-in-water micellar isotropic aqueous (80 to 98% water) compositions made of biomimetic phospholipids (biodegradable, and friendly to the skin) of the type alkyl amide propyl-propylene glycol-dimonium chloride phosphate and alkyl polyglycerol monoesters. It is an embodiment of the present invention to provide a composition comprising polydisperse mixture structures of oil in water type isotropic micellar solutions that range from about 4 to about 30 nm in size or from about 20 to about 50 nm. Being biomimetic, these phospholipids are biodegradable and friendly to the skin.

It is an embodiment of the present invention to incorporate components with limited solubility in water into the micellar structures. Within this framework, sparingly or barely water-soluble chemicals can be incorporated into isotropic solutions beyond their single aqueous solubility or beyond their maximum combined aqueous solubilization with other chemicals. These chemicals could include aromatic carboxylic acids, aromatic dicarboxylic acids, aromatic tricarboxylic acids, aromatic monohydroxy carboxylic acids, aromatic dihydroxy carboxylic acids, aromatic three hydroxy carboxylic acids, linear saturated alkyl dicarboxylic acids, linear unsaturated dicarboxylic acids, amino acids and alcohols such as phenoxyethanol and phenethyl alcohol. In some aspects, increasing the concentration of active biocides with limited water solubility correlates with an increase of the biocide efficacy of the formulation.

It is an embodiment of the present invention to provide isotropic micellar solutions, in the nanometric scale, that self-assemble differently, depending on the conditions. In specific embodiments, the self-assembled structures in association with slightly soluble, and/or sparingly soluble, and/or soluble and/or freely soluble chemicals produce different biocide efficacies as a result of an interplay of different aspects such as the nature of the components, concentrations, partition of the chemicals in the solution, rigidity of the micelle, rigidity of the microorganisms, dissociation of chemicals, pH, chemicals octanol-water partition coefficients, and solubility of chemicals among others.

To achieve stability, biocide efficacy, or compatibility with skin and/or surfaces (porous or non-porous surfaces), it is an embodiment of the present invention to provide anticorrosive, organic and inorganic salts including benzotriazole, sodium EDTA, sodium benzoate, calcium benzoate, sodium citrate, potassium citrate, lithium citrate, magnesium citrate, calcium citrate, magnesium acetate, sodium chloride, potassium chloride, lithium chloride, magnesium chloride, magnesium nitrate, and magnesium sulfate in concentrations ranging from 0.001 to 1% w/w considering the total weight of the composition.

It is an embodiment of the present invention to provide compositions that have synergistic anticorrosive effect of mixtures of benzotriazole and magnesium nitrate, particularly for the low pH range of 4 or lower and in the presence of 0.01 to 2.9% w/w hydrogen peroxide considering the total weight of the composition.

It is an embodiment of the present invention to provide compositions with a range of ingredients and/or type of ingredients that can undergo to physical and chemical instability. Physical instability relates to formulations unable to form micellar structures under certain conditions and/or formulations that may undergo phase separation. The latter refers to compositions in which its compounds undergo chemical reaction to form different compounds such that the efficacy of a formulation is diminished. In one embodiment of the present invention there is provided stable physical and chemical disinfectant compositions that are ready to use, which can be poured or sprayed to paper or hydrophobic wipes such as polypropylene.

It is an embodiment of the present invention to provide an aqueous isotropic micellar composition effective in killing mycobacteria, bacteria, fungi and deactivating viruses in short disinfection contact times (<1 minute) having PH of from about 0.3 to 8.

According to an embodiment of the present invention there is provided compositions comprising a biomimetic phospholipids of the type alkyl amide propyl-propylene glycol-dimonium chloride phosphate. In some embodiments, the concentration of alkyl amide propyl-propylene alycol-dimonium chloride phosphate is about 0.3 to 5% (w/w) considering the total weight of the micellar composition.

According one embodiment, the phospholipid is Myristamidopropyl PG-Dimonium Chloride Phosphate, or Cocamidopropyl PG-Dimonium Chloride Phosphate, or Linoleamidopropyl PG-dimonium Chloride Phosphate or a combination thereof.

According to an embodiment of the present invention there is provided micellar compositions further comprising at least a polyglyceryl fatty acid ester. In some embodiments, the polyglyceryl fatty acid ester is in a concentration of from 0 to 8% w/w the total weight of the micellar composition. According one embodiment the polyglyceryl fatty acid ester is polyglyceryl-10 caprylate/caprate, or polyglyceryl-4 laurate/sebacate and polyglyceryl-4 caprylate/caprate, or polyglyceryl-4 laurate/sebacate and polyglyceryl-6 caprylate/caprate or a combination thereof.

According to an embodiment of the present invention there is provided micellar compositions further comprising at least an alkyl (C8 to C18) ethoxylate (4 to 16) surfactant or their polydisperse mixture, or alkylpolysaccharides such as D-Glucopyranose, oligomeric, decyl-octyl glycoside or polyoxyethylene derivatives of sorbitan esters such as POE (20) sorbitan monopalmitate or POE (20) sorbitan monooleate.

According to an embodiment of the present invention there is provided micellar compositions wherein the non-ionic surfactant is in a concentration of from 0 to 10% w/w of the total weight of the micellar composition.

According to an embodiment of the present invention there is provided micellar compositions further comprising hydrogen peroxide in concentrations of about 0.1 to 2.9% w/w considering the total weight of the micellar composition According to an embodiment of the present invention there is provided a composition further comprising at least an aromatic carboxylic acid and/or aromatic dicarboxylic or tricarboxylic acid, and/or aromatic hydroxy carboxylic acid, aromatic dihydroxy mono or di carboxylic acid in concentrations of about 0.01 to 1% w/w considering the total weight of the micellar composition. According to this claim, the preferred aromatic carboxylic acid is benzoic acid.

According to an embodiment of the present invention there is provided a composition further comprising at least a saturated alkyl mono, di, or tri carboxylic acid and/or unsaturated alkyl dicarboxylic acid, and or a saturated alkyl mono, di, or tri hydroxy mono, di, or tri carboxylic acid in a composition from about 0.01 to 5% w/w considering the total weight of the micellar composition.

According to an embodiment of the present invention there is provided a composition further comprising at least an aromatic glycol ether from 0.5 to 5% w/w considering the total weight of the micellar composition. According one embodiment, the aromatic glycol ether is phenoxyethanol.

According to an embodiment of the present invention there is provided a composition further comprising benzotriazole in a concentration of from about 0.01 to 1% w/w considering the total weight of the micellar composition. In one embodiment, the benzotriazole is in an amount sufficient as an anti-corrosive.

According to an embodiment of the present invention there is provided a composition further comprising organic salts functioning as anticorrosive and/or chelant and/or PH adjustor and/or kosmotrophe in a concentration from of about 0.01 to 2% w/w considering the total weight of the micellar composition. According one embodiment, the organic salt is a salt of an alkali metal, a salt of an alkaline earth metal such as lithium, sodium, or potassium citrate, calcium or magnesium citrate, sodium or calcium benzoate, sodium EDTA, or magnesium acetate or a mixture thereof. According one embodiment, the salt is sodium citrate.

According to an embodiment of the present invention there is provided a composition further comprising inorganic salts acting as synergistic biocides. According one embodiment, the inorganic salt is a salt of an alkali metal, a salt of an alkaline earth metal such as lithium, sodium or potassium chloride, calcium or magnesium chloride, or mixture thereof.

According to an embodiment of the present invention there is provided a composition further comprising at least an aromatic glycol ether from about 0.5 to 5% w/w considering the total weight of the micellar composition. According one embodiment, the aromatic glycol ether is phenoxyethanol.

According to an embodiment of the present invention there is provided a composition further comprising benzotriazole in a concentration from about 0.01 to 1% w/w considering the total weight of the micelar composition.

According to an embodiment of the present invention there is provided a composition further comprising inorganic salts acting as synergistic biocides. According to one embodiment, the inorganic salt is a salt of an alkali metal, a salt of an alkaline earth metal such as lithium, sodium or potassium chloride, calcium or magnesium chloride, or a mixture of them. According to one embodiment, the salt is magnesium nitrate.

According to an embodiment of the present invention there is provided a method to disinfect a surface from one or more of mycobacteria, bacteria, fungi, viruses, the method comprising: applying the composition described herein to a surface to disinfect the surface from one or more of mycobacteria, bacteria, fungi, and viruses within a contact time on the surface of less than 1 minute.

According to an embodiment of the present invention there is provided a use of the composition to disinfect a surface from one or more of mycobacteria, bacteria, fungi, and viruses within a contact time on the surface of less than 1 minute.

According to an embodiment of the present invention there is provided a micellar composition for endodontic irrigation that is biocompatible and biodegradable. In one aspect, the micellar nature of composition allows for modification of the formulations to achieve desirable chemical, mechanical, and biological irrigant properties.

In one aspect, the micellar composition can be formulated with pHs closer to physiological pH range (7.35 to 7.45) to prevent tissue damage while still having significant biocide efficacy and suitable for endodontic irrigation.

In one embodiment, bactericidal potency of the endodontic irrigants compositions of the present disclosure can be increased by increasing actives concentration of poorly water soluble components to levels not used before Within the embodiments, the endodontic irrigant compositions of the present disclosure can prevent or eliminates microorganism infection because the micellar compositions can be adjusted with desired chemical, mechanical and biocide activity while still being biocompatible due to the nature of the micellar structure components which can also act synergistically with reduced amounts.

Within the embodiments, the endodontic irrigant compositions can be produced with adjusted rheological properties and wetting behavior to promote removal of necrotic tissue. Similarly, the surface tension of formulations can be adjusted so that the fluid can flow into inaccessible areas and remove debris.

In one aspect, the endodontic irrigant compositions can contain high hydrogen peroxide concentrations, such as around 3%, while still being noncorrosive or only mildly corrosive to metallic surfaces.

According to an embodiment of the present invention there is provided an endodontic irrigant micellar composition for use in preventing or eliminating bacteria and/or bacterial products within a root canal, the composition comprises: a phospholipid; a nonionic surfactant; hydrogen peroxide; and aromatic carboxylic acid and/or aromatic dicarboxylic or tricarboxylic acid, and/or aromatic hydroxy carboxylic acid, and/or aromatic dihydroxy, or trihydroxy mono or di carboxylic acid, wherein the composition prevents of eliminates bacteria from a root canal within a contact time of less than 1 minute. In one aspect, the pH of endodontic irrigant micellar composition is from about 4 to about 8.

According to an embodiment of the present invention there is provided a method of disinfecting a root canal comprising contacting a tooth with an endodontic irrigant micellar composition.

According to an embodiment of the present invention there is provided a use of an endodontic irrigant micellar composition to disinfect a root canal from bacteria within a contact time on the surface of less than 1 minute.

DETAILED DESCRIPTION

Reference will be made below in detail to exemplary embodiments of the invention, examples of which are illustrated in the accompanying drawings. Wherever possible, the same reference numerals used throughout the drawings refer to the same or like parts.

Exemplary Phospholipid Surfactants

The soft nanoparticle structures of the present invention can be formed using the surfactants described in Table I. The phospholipids are mild for applications in skin and hair and suitable for all types of skin while polyglyceryl fatty acid esters have been reported to be used in the cosmetic industry with concentrations of about 24% for products in the eye area and about 40% in lipstick formulations.

TABLE I

Description of phospholipid surfactants that can be used

| NAME | INCI | ACRONYM | PRODUCER |
|---|---|---|---|
| Ariasilk Phospholipid EFA | Linoleamidopropyl PG-dimonium Chloride Phosphate | A-EFA | CRODA |
| Ariasilk Phospholipid PTC | Cocamidopropyl PG-Dimonium Chloride Phosphate | A-PTC | CRODA |
| Ariasilk Phospholipid PTM | Myristamidopropyl PG-Dimonium Chloride Phosphate | A-PTM | CRODA |
| Polyaldo 10-1-CC | Polyglyceryl-10 Caprylate/Caprate | POLYALDO | LONZA |

Solubility Studies

The solubility of difficult to solubilize substances may be affected by the presence of other solutes. While the solubilities of benzoic acid and phenoxyethanol in pure water are about 0.33 and 2.6% w/w, respectively, our studies indicate that benzoic acid dissolves only about 0.13% in an aqueous solution containing 2.5% w/w of phenoxyethanol at normal conditions (25° C.). This represents a decrease in the solubility of benzoic acid of about 55%. To bring up the solubility of benzoic acid to 0.29%, in an aqueous solution containing 2.5% of phenoxyethanol, the Myristamidopropyl PG-Dimonium Chloride phosphate (Arlasilk PTM) is included in an amount of about 1.4% w/w of the entire composition. The increased mixed solubility of the solution is due to the self-assembly of the surfactant that form micelles and absorb both chemicals, benzoic acid and phenoxyethanol, partially or completely into its structures.

If needing further to increase the amount of benzoic acid in the same solution, composed of 2.5% phenoxyethanol and water, then the surfactant concentration should also be increased to avoid phase separation. The minimum surfactant amount to avoid phase separation in a micellar solution is denominated the optimum surfactant concentration, which varies with the amount of difficult to solubilize chemicals present in the aqueous micellar solution. This optimum amount is typically found by performing phase scan studies known to those skilled in the art.

Figure 1:
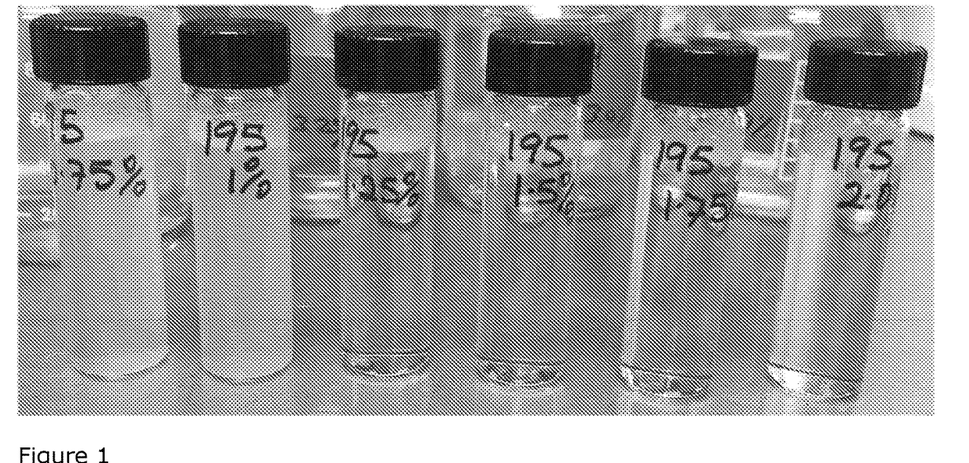
FIG. 1 shows the phase scan of exemplary solutions with varying surfactant concentrations.

When an aqueous solution of polyglyceryl ester of fatty acid (0.2%), hydrogen peroxide (0.5%), Citric acid (0.3%), mandelic acid (0.6%), benzoic acid (0.25%), phenoxyethanol (2%), magnesium nitrate (0.05%) and benzotriazole (0.15%), the optimum surfactant concentration, Arlasilk PTM, is about 1.25%, as shown in FIG. 1. If the micellar solution does not phase separate or presents a milky solution with certain variations of temperature or time, it is regarded as being physically stable.

It should be noted that having an isotropic optimum micellar solution may not guarantee stability. Similarly, it is possible that over time an isotropic solution would exhibit color change, typically, on oxidation and therefore not chemically stable. Hence, the composition(s) is/are formulated to remain stable, and/or does not react or reacts very slowly.

Figure 2:
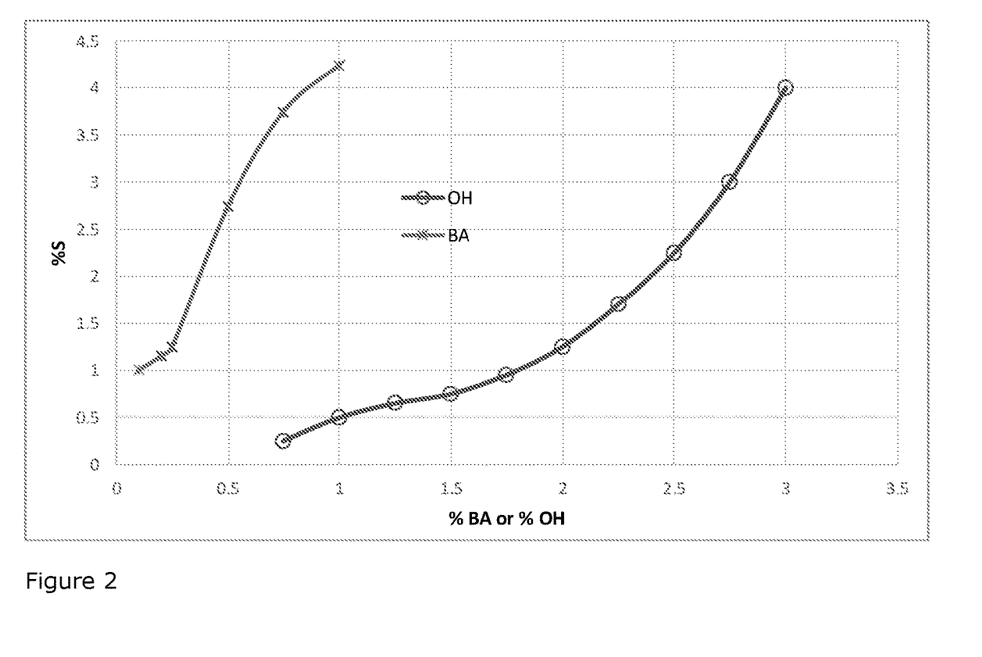
FIG. 2 is a graph showing surfactant concentration % S with varying concentration of phenoxyethanol (OH) and benzoic acid (BA)

If in the embodiment described above all the concentrations are maintained constant except for the one of benzoic acid that is varied from 0.1 to 1% w/w, the micellar solution's optimum amount of surfactant concentration increases with increases of benzoic acid. Similarly, if in the same embodiment all the amounts are again kept the same except for the alcohol's concentration that is varied from 1.5 to 3%, the optimum surfactant concentration also increases. Both cases are depicted in FIG. 2.

Stability Studies

Besides the circumstances described above, the stability of a disinfectant product can also be affected by the evaporation of active and non-active ingredients as changes in concentration of the solution can dramatically diminish their biocide efficacy. This is indeed the case of chlorine and most alkyl alcohols of commercial use. The compositions consist of combinations of solid organic acids that range from very slightly to freely soluble in water. Some compositions may consist of liquid organic acids, which, however, have boiling points over 100° C.

Known liquid disinfectants may include surfactants. Some surfactants are known to cause Environmental Stress Cracking (ESC) of polymeric materials. ESC is the most common cause of failure of thermoplastic amorphous polymers used to contain commercial products. To assess the intrinsic stability of the disinfectant solutions or their stability associated with their containers or the containers itself, packaged samples need to be stored over certain periods of time: typically, between 1 to 3 years. To facilitate the introduction and development of new products, accelerated stability methods have been established. An accepted method consists on subjecting product candidates or products at elevated temperatures over reduced periods of time and under controlled environmental conditions. The correlation between real time and the accelerated aging time is calculated using an Arrhenius type equation as established by ASTM F1980-16. For most regulatory agencies, a sample subjected to 55° C. for 15-days correlate to 1 year of real time storage conditions. Once established the optimum conditions of a specific formulation, the physical and chemical integrity of the compositions recited in this work, sealed in high-density polyethylene bottles, were evaluated at accelerated conditions of 55° C. for 15 and 30 days. The samples were removed every three days and their physical and chemical stability was assessed by titration of the active ingredient (hydrogen peroxide loss <5%), turbidity, oxidation reduction potential (ORP), conductivity and PH. The bottles were assessed by visual observation. From these evaluations, the stable optimum surfactant concentration was established while the bottles remained without ESC signs or leaks. Table II shows a typical recording of such tests where the shaded cells represent days at which the solutions were physically or chemically unstable while the non-shaded cells represent days at which the solutions remained stable and the bottles without significant structural or visual changes. From these evaluations, the technology proposed in this art produces compositions that would have a shelf life exceeding 2 years.

TABLE II

Accelerated stability test at 55° C. +−2 of different samples for 30 days, no humidity control.

| Formulation | Time | Day 9 | Day 12 | Day 15 | Day 18 | Day 21 | Day 24 | Day 28 | Day 30 |
|---|---|---|---|---|---|---|---|---|---|
| I | 10:30 | 12 Apr. 2019 | 15 Apr. 2019 | 18 Apr. 2019 | 21 Apr. 2019 | 24 Apr. 2019 | 6 May 2019 | 9 May 2019 | 12 May 2019 |
| XXXVI | 10:30 | 13 Apr. 2019 | 15 Apr. 2019 | 18 Apr. 2019 | 21 Apr. 2019 | 24 Apr. 2019 | 6 May 2019 | 9 May 2019 | 12 May 2019 |

TABLE II-continued

Accelerated stability test at 55° C. +−2 of different samples for 30 days, no humidity control.

| Formulation | Time | Day 9 | Day 12 | Day 15 | Day 18 | Day 21 | Day 24 | Day 28 | Day 30 |
|---|---|---|---|---|---|---|---|---|---|
| VII | 10:30 | 14 Apr. 2019 | 15 Apr. 2019 | 18 Apr. 2019 | 21 Apr. 2019 | 24 Apr. 2019 | 6 May 2019 | 9 May 2019 | 12 May 2019 |
| II | 10:30 | 15 Apr. 2019 | 15 Apr. 2019 | 18 Apr. 2019 | 21 Apr. 2019 | 24 Apr. 2019 | 6 May 2019 | 9 May 2019 | 12 May 2019 |
| Equivalent real time | | | 1 year ⟵⎯⎯⎯⎯⟶ | | | | 2 year ⟵⎯⎯⎯⎯⟶ | | | |

Particle Size Characterization

Figure 3:
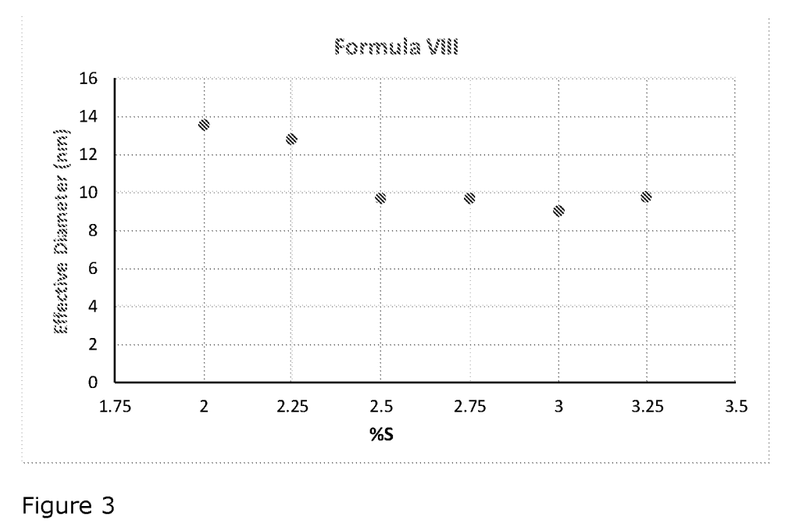
FIG. 3 is a graph showing the effective diameter of the micelles against various surfactant concentrations.

The micelles were characterized using dynamic light scattering (DLS) using a 90Plus/Bi-mas nanoparticle size analyzer of Brookhaven instruments. Particle size variations of formulation VIII (described in Table IV) with surfactant concentration variation, from 2 to 3.25% (the rest of components remains constant), were measured. The analysis indicates formation of moderate (0.1-0.4) to broad (>0.4) polydisperse mixture of swollen micelles ranging from about 8.5 to 14 nm particle size depending on the surfactant concentration. FIG. 3 shows the effective diameter, an average of 6 measurements for each point, with varying surfactant concentrations.

Biocide Efficacy

To assess the biocide efficacy of the formulations according to the present invention, the formulations were tested using methods required by Health Canada and the Environmental Protection Agency (EPA). These methods generally involve those developed by the Association of Official Analytical Chemists (AOAC) and the American Society for Testing and Materials (ASTM), as indicated in Table III. The passing criteria as well as the testing conditions were those established by the regulatory agencies mentioned above. A summary of the test organisms, methods, reduction of microorganisms and number of carriers is presented in Table III. All the efficacy tests of this work, according to Table III, were performed at room temperature conditions.

TABLE III

Criteria and methods used to determine the efficacy of the formulations

| | TEST ORGANISM | TEST METHOD | SOIL LOAD | MIN LOG REDUCTION | Plate count |
|---|---|---|---|---|---|
| Tuberculocidal* | Mycobacterium terrae ATCC 15755 | ASTM E2111-12 | 5% (Tryptone, Bovin Serum Albumin, Bovine Mucin) | Log 4 | +0/10 |
| Virucidal | Poliovirus 1 ATCC VR-1562 | ASTM E1053 | 5% (Fetal bovine serum) | Log 3 | +0/1 |
| Fungicidal | Trichophyton interdigitale ATCC 9533 | AOAC 955.17 | 5% (Fetal bovine serum) | Between Log 4 and Log 5 | +0/10 |
| Bactericidal | Staphylococcus aureus ATCC 6538 | AOAC | 5% (Fetal bovine serum) | Log 6 | +2 or 3/60 |

*M. terrae is the test microorganism for tuberculocidal. The last column in Table III refers to the maximum number of plates showing growth (+), after disinfection, in order to pass a test. For broad spectrum virucidal effect, a log 3 reduction is required in the USA and for Canada a log 3 is also required but with complete virus deactivation.

Tuberculocidal Efficacy

Table IV show examples compositions according to the present invention, containing hydrogen peroxide in similar amounts (0.5%), associated with tuberculocidal efficacy against *M. terrae*. It is observed that the use of phenoxyethanol, a sparingly soluble compound, correlates generally with better efficacy (Formulations I to III). However, higher amounts of this alcohol do not necessarily ensure that the formulations perform better than others with lower alcohol if it doesn't contain the right combination of chemicals, e.g., Formulation III compared to any from IV to VIII. It is observed that the combination of this alcohol and a slightly soluble acid, such as benzoic acid, provides tuberculocidal effects in accordance to the criteria established in Table III. i.e., 1-minute contact time, 0 positives in all the carriers and a log reduction greater than 4, as shown in formulations VI to VIII.

TABLE IV

Tuberculocidal efficacy of different examples against mycobacterium terrae

| Ingredient | 1 | II | III | IV | V | VI | VII | VIII |
|---|---|---|---|---|---|---|---|---|
| Polyaldo 10-1-C (S1 Lonza) | 0.65 | 0.65 | 0.65 | 0.65 | 0.65 | 0.65 | 0.65 | 0.65 |
| A-EFA | 0.7 | — | 2.25 | — | 0.7 | — | — | — |
| A-PTC | — | — | — | 0.85 | — | 2 | — | — |

TABLE IV-continued

Tuberculocidal efficacy of different examples against mycobacterium terrae

| Ingredient | I | II | III | IV | V | VI | VII | VIII |
|---|---|---|---|---|---|---|---|---|
| A-PTM | — | 1.25 | — | — | — | — | 0.75 | 2 |
| Hydrogen Peroxide | 0.5 | 0.5 | 0.5 | 0.5 | 0.5 | 0.5 | 0.5 | 0.5 |
| Citric acid | — | — | — | — | — | — | — | 0.3 |
| Mandelic Acid | — | — | — | — | — | — | — | 0.6 |
| dl-aspartic acid | 0.5 | — | — | — | 0.5 | 0.5 | — | — |
| dl-malic | — | 0.5 | 0.5 | 0.5 | — | — | 0.7 | — |
| Lactic acid | 0.6 | 0.7 | 0.6 | 0.6 | 0.6 | 0.6 | — | — |
| Benzoic Acid | 0.1 | — | — | 0.1 | 0.1 | 0.1 | 0.18 | 0.25 |
| 2-phenoxyethanol | 1.5 | 2.5 | 3 | 2 | 2 | 2.5 | 2 | 2 |
| Sodium citrate dihydrate | 0.3 | 0.3 | 0.3 | 0.3 | 0.3 | 0.3 | 0.3 | 0.05 |
| Benzotriazole | — | 0.15 | 0.15 | 0.15 | — | 0.15 | 0.15 | 0.15 |
| water | 95.15 | 93.45 | 92.05 | 94.35 | 94.65 | 92.7 | 94.77 | 93 |
| Total | 100 | 100 | 100 | 100 | 100 | 100 | 100 | 100 |
| Average Log reduction | 0.2 | 2.5 | 3.184 | 5.5 | 5.3 | 6.4 | 5.5 | 5.87 |
| Positives | 10 | 10 | 10 | 3 | 1 | 0 | 0 | 0 |
| pH | 3.4 | 3.1 | 3.3 | 3.1 | 3.3 | 3.29 | 3.3 | 2.53 |
| Contact time (minutes) | 1 | 1 | 1 | 1 | 1 | 1 | 1 | 1 |

Virucidal Efficacy

The susceptibility of different microorganisms to different disinfectants vary depending on their structure and physiology. Their intrinsic resistance to disinfectants is traditionally classified from more to less resistant as Prions>Spores>Mycobacteria>Small Non-enveloped viruses>Fungal Spores>Gram negative bacteria>Vegetative Fungi>Large Non-enveloped Viruses>Gram Positive bacteria>Enveloped Viruses. Hence, for the same disinfection contact time, following the criteria of Table III, one would expect that a efficacious formulation against *Mycobacterium* strains would be more efficient or at least as efficient against Non-enveloped viruses and Fungi. However, most of the efficacious formulations against *Mycobacterium Terrae*, in Table II, are ineffective against Poliovirus for the same contact time (1 minute), as shown in Table V. This would suggest that the acid-alcohol effective combination for *Mycobacterium* strains is ineffective or not enough against such virus. Typically, very slightly soluble to sparingly soluble organic acids in water tend to have high octanol-water partition coefficient (Log P) while the soluble to freely soluble ones tend to have low Log P. Surprisingly, having the formulation scheme of Table IV as a reference, the acids-alcohol effective combination against *mycobacterium* plus an acid with a seemingly antagonistic behavior of having, relatively, high solubility in water and relatively high Log P such as mandelic acid and a dicarboxylic acid turns the formulation also effective against poliovirus, as shown in formulations VIII, XII and XIII. This ratio between mandelic to the complementary dicarboxylic acid shows to be efficient around 2. From formulations XV and XVIII, it is observed that the presence of a slightly soluble acid, such as benzoic acid, also increases the virucidal efficacy of the formulation. In addition, these combinations include an organic salt such as sodium citrate. It is also noticed that a higher alcohol concentration (>2%), within this framework, prevents the virucidal efficacy of the formulations, as seen in formula XX. It is also noted that increasing the PH of the solution, close to 4, also turns the solution ineffective, as observed with Formula XIX.

TABLE V

Virucidal efficacy of different examples against Poliovirus I.

| Ingredient | IX | VII | X | XI | VIII | XII | XIII | XIV | XV | XVI | XVII | XVIII | XIX | XX |
|---|---|---|---|---|---|---|---|---|---|---|---|---|---|---|
| Polyaldo 10-1-C (S1 Lonza) | 0.65 | 0.65 | 0.65 | 0.65 | 0.65 | 0.65 | 0.65 | 0.65 | 0.65 | 0.65 | 0.65 | 0.65 | 0.65 | 0.65 |
| A-EFA | — | — | — | — | — | — | — | — | — | — | — | — | — | — |
| A-PTC | — | — | — | — | — | — | — | — | — | — | — | — | — | — |
| A-PTM | 2 | 1.25 | 1.25 | 2 | 2 | 1.75 | 1.75 | 1.75 | 1.5 | 2.25 | 2.25 | 1.75 | 1.75 | 2.75 |
| Hydrogen Peroxide | 0.5 | 0.5 | 0.5 | 0.5 | 0.5 | 0.5 | 0.5 | 0.5 | 0.5 | 0.5 | 0.5 | 0.5 | 0.5 | 0.5 |
| Lactic acid | 0.6 | 0.7 | 0.3 | 0.3 | — | — | — | — | — | — | — | — | — | — |
| L-Pyroglutamic | — | — | 0.6 | — | — | — | — | — | — | — | — | — | — | — |
| Citric acid | — | — | — | — | 0.3 | — | — | 0.8 | — | — | — | — | — | 0.3 |
| Mandelic Acid | — | — | — | 0.6 | 0.6 | 0.6 | 0.6 | 0.2 | 0.2 | 0.6 | 0.8 | 0.2 | 0.2 | 0.6 |
| dl-aspartic acid | 0.5 | — | — | — | — | — | — | — | — | — | — | — | — | — |
| dl-malic | — | — | — | — | — | 0.3 | — | — | — | — | — | — | — | — |
| Glutaric | — | — | — | — | — | — | 0.3 | — | 0.8 | — | — | 0.8 | 0.8 | — |
| Benzoic Acid | 0.1 | 0.18 | 0.25 | 0.25 | 0.25 | 0.25 | 0.25 | 0.18 | 0.18 | 0.25 | 0.25 | 0.25 | 0.25 | 0.25 |
| 2-phenoxy-ethanol | 2.5 | 2 | 2 | 2 | 2 | 2 | 2 | 2 | 2 | 2 | 2 | 2 | 2 | 2.5 |
| Sodium citrate dihydrate | 0.3 | 0.3 | 0.3 | 0.3 | 0.05 | 0.15 | 0.1 | 0.05 | 0.05 | — | — | 0.05 | 0.3 | 0.05 |

TABLE V-continued

Virucidal efficacy of different examples against Poliovirus I.

| Ingredient | IX | VII | X | XI | VIII | XII | XIII | XIV | XV | XVI | XVII | XVIII | XIX | XX |
|---|---|---|---|---|---|---|---|---|---|---|---|---|---|---|
| Benzotriazole | 0.15 | 0.15 | 0.15 | 0.15 | 0.15 | 0.15 | 0.15 | 0.15 | 0.15 | 0.15 | 0.15 | 0.15 | 0.15 | 0.15 |
| water | 92.7 | 94.27 | 94 | 93.25 | 93.75 | 93.65 | 93.7 | 93.72 | 93.97 | 93.6 | 93.4 | 93.65 | 93.4 | 92.25 |
| Total | 100 | 100 | 100 | 100 | 100.25 | 100 | 100 | 100 | 100 | 100 | 100 | 100 | 100 | 100 |
| Log reduction | NR | 0.75 | 1.13 | 2.13 | 4.13 | 3.88 | 3.38 | 2.25 | 1.13 | 1.13 | 1.25 | 2.38 | 0.88 | 0.88 |
| pH | 3.3 | 3.29 | 3.19 | 3.29 | 2.52 | 2.86 | 2.87 | 2.63 | 2.94 | 2.47 | 2.395 | 3.08 | 3.85 | 2.62 |
| Contact time (minutes) | 1 | 1 | 1 | 1 | 1 | 1 | 1 | 1 | 1 | 1 | 1 | 1 | 1 | 1 |

Fungicidal Efficacy

Emerging fungal infections caused by *Trichophyton interdigitale* has become recently the predominant cause of dermatophytosis in humans. However, vegetative form of fungi, such as *T. interdigitale*, have found generally to be more resistant to biocides than nonsporulating bacteria. The intrinsic resistance of these microorganisms is due to their cell wall made of chitins, glucans and polymers, which in addition may be cross-linked. This confirmed as the fungicidal efficacy contact times were of 4 minutes or more even if the bactericidal contact times could be much shorter. Table VI shows exemplary compositions that are efficacious against *T. interdigitale* (a test organism for fungicidal claims in Canada and the USA) within 1-minute contact time.

TABLE VI

Fungicidal efficacy of formulations against *Trichophyton interdigitale*

| Ingredient | XXXVI | XXXVII |
|---|---|---|
| Polyaldo 10-1-C (S1 Lonza) | 0.2 | 0.2 |
| A-PTM | 2 | 1.5 |
| Hydrogen Peroxide | 0.5 | 0.5 |
| Citric acid | 0.3 | 0.3 |
| Mandelic Acid | 0.6 | 0.6 |
| Benzoic Acid | 0.25 | 0.25 |
| 2-phenoxyethanol | 2 | 2 |
| Sodium citrate dihydrate | 0.05 | — |
| Magnesium nitrate | — | 0.05 |
| Benzotriazole | 0.15 | 0.15 |
| water | 93.95 | 94.45 |
| Total | 100 | 100 |
| Log reduction | 5.16 | 5.16 |
| +ve | 0/10 | 0/10 |
| PH | 2.56 | 2.3 |
| Contact time (minutes) | 1 | 1 |

Bactericidal Efficacy

Bacterial disinfection is generally believed to be more easily achieved than viral deactivation. However, bacteria are diverse and are among the most adaptable microorganisms. It is referred that they can, literally, be trained to become less susceptible to antibiotics and biocides; a fact that occurs with sustained environmental stress or poor disinfection practices. To overcome such eventual problems, the present disclosure provide for the regulation of the bactericidal potency by increasing the actives concentration depending on the required contact times and eventual acquired resistance of bacteria. Table VII shows exemplary compositions that allow bactericidal efficacy, against *Staphylococcus aureus*, within 1 minute. It should be noted that the actives in this specific example that allow such efficacy in these compositions, are either phenoxyethanol and/or hydrogen peroxide. The former poses technical limitations as it can only be incorporated in a water continuous environment, beyond certain levels, using the micellar technology. The latter present practical limitations as it can only be added in specific amounts if its stability and compatibility are controlled.

TABLE VII

Bactericidal efficacy of examples against *Staphylococcus aureus*

| Ingredient | XXXVIII | XXXIX |
|---|---|---|
| Polyaldo 10-1-C (S1 Lonza) | 0.2 | 0.65 |
| A-PTM | 1.5 | 3.25 |
| Hydrogen Peroxide | 0.75 | 0.5 |
| Citric acid | 0.3 | 0.3 |
| Mandelic Acid | 0.6 | 0.6 |
| Benzoic Acid | 0.25 | 0.25 |
| 2-phenoxyethanol | 2 | 2.5 |
| Sodium citrate dihydrate | | 0.05 |
| Magnesium nitrate | 0.05 | |
| Benzotriazole | 0.15 | 0.15 |
| water | 94.2 | 91.75 |
| Total | 100 | 100 |
| Log reduction | 6.35 | 6.64 |
| +ve | +0/60 | +0/60 |
| PH | 2.38 | 2.57 |
| Contact time (minutes) | 1 | 1 |

Corrosion and Anti-Corrosive Effects

Hydrogen peroxide and acids typically cause corrosion on metals depending on their nobility. The higher the metal ranks in nobility charts, the more resistant to corrosion it is. Bare aluminum is known to rank low in such tables. Hence, it is an ideal material to be used in compatibility tests as it provides compatibility reference for other materials based also on nobility charts. On the other hand, anodized aluminum is a typical material used in different tools and devices. Both materials, bare aluminum (Type A, ASTM: B209) and anodized aluminum (Type AN, ASTM: B209) obtained from Q-Labs, were tested using an emulation of the G031-72 ASTM immersion test, for 17 hours.

It is also important to note that aluminum, and most of its alloys, are vulnerable to corrosion by the attack of different acids below PHs 4.5 and beyond 8.5. Considering some formulations according to the present invention, and other commercial disinfectants, have PH's around 2, the evaluation of corrosion is of interest.

Table VIII show examples of anticorrosive formulations. Although the components of these formulations may have different synergistic effects, the following is intended to assess the anticorrosive effect on aluminum of organic and inorganic salts that also play kosmotropic effects and other roles.

TABLE VIII

Composition examples used to show the anticorrosive behavior

| | XX | XXI | XXII | XXIII | XXIV | XXV | XXVI | XXVII | XXVIII | XXIX |
|---|---|---|---|---|---|---|---|---|---|---|
| Polyaldo 10-1-C (S1 Lonza) | 0.65 | 0.65 | 0.65 | 0.65 | 0.65 | 0.65 | 0.65 | 0.65 | 0.65 | 0.65 |
| A-PTM | 2.5 | 2 | 2.35 | 2 | 2.35 | 2 | 2.35 | 2 | 2.5 | 3 |
| Hydrogen Peroxide | 0.5 | 0.5 | 0.5 | 0.5 | 0.5 | 0.5 | 0.5 | 0.5 | 0.5 | 0.5 |
| Citric acid | 0.3 | 0.3 | 0.3 | 0.3 | 0.3 | 0.3 | 0.3 | 0.3 | 0.3 | 0.3 |
| Mandelic acid | 0.6 | 0.6 | 0.6 | 0.6 | 0.6 | 0.6 | 0.6 | 0.6 | 0.6 | 0.6 |
| Benzoic acid | 0.18 | 0.18 | 0.18 | 0.18 | 0.18 | 0.18 | 0.18 | 0.18 | 0.25 | 0.25 |
| 2-phenoxyethanol | 2.5 | 2.5 | 2.5 | 2.5 | 2.5 | 2.5 | 2.5 | 2.5 | 2.5 | 2.5 |
| Sodium citrate dihydrate | 0.05 | 0.05 | — | — | — | — | — | — | — | 0.05 |
| Magnesium nitrate | — | — | 0.05 | 0.05 | — | — | — | — | — | 0 |
| Potassium citrate | — | — | — | — | 0.05 | 0.05 | — | — | — | — |
| Sodium chloride | — | — | — | — | — | — | 0.05 | 0.05 | — | — |
| Sodium benzoate | — | — | — | — | — | — | — | — | 0.05 | — |
| Sodium EDTA | — | — | — | — | — | — | — | — | — | 0.05 |
| Benzotriazole | 0.15 | — | 0.15 | — | 0.15 | — | 0.15 | — | — | — |
| DI water | 92.57 | 93.22 | 92.72 | 93.22 | 92.72 | 93.22 | 92.72 | 93.22 | 92.65 | 92.15 |
| Total | 100 | 100 | 100 | 100 | 100 | 100 | 100 | 100 | 100 | 100 |
| pH | 2.62 | 2.23 | 2.33 | 1.98 | 2.523 | 1.98 | 2.05 | 1.98 | 2.1 | 2.04 |

Figure 4:
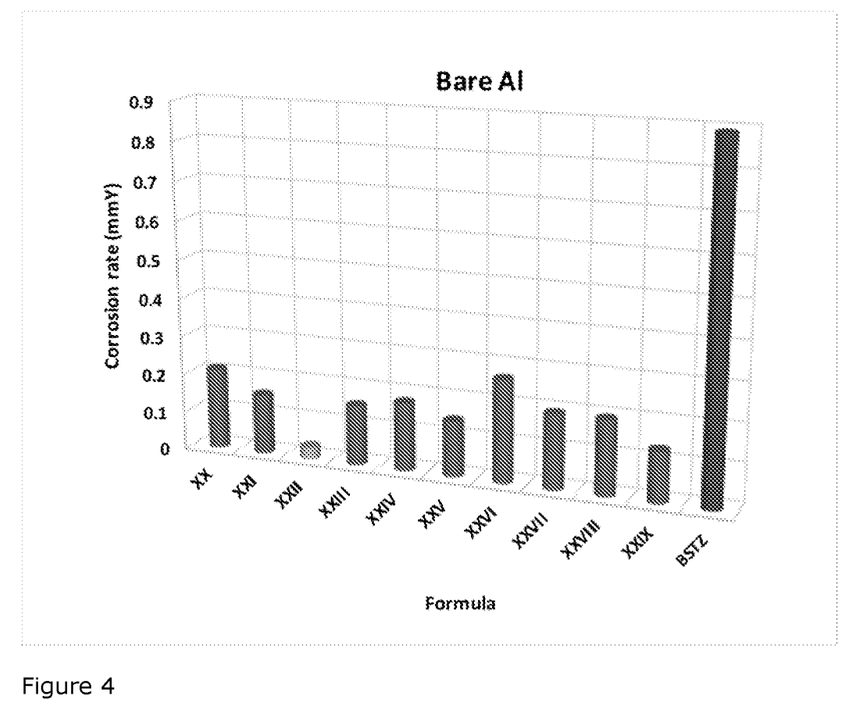
FIG. 4 is a graph showing corrosion rate of formulations described in Table VIII on Bare Aluminum.

Table IX and FIG. 4 show the corrosion behavior of formulations XX to XXIX, on bare aluminum compared to a hydrogen peroxide-based disinfectant product used as a reference: biosanitizer S1 (BSTZ) of saniswiss. All the formulations show milder corrosion behavior compared to BSTZ. Notably, XXII is less corrosive than all the formulations, and within about an order of magnitude when compared to BSTZ. It is noted, with this formula that the combination of magnesium nitrate with benzotriazole, a known anticorrosive compound, results in enhanced anticorrosive features. In other cases, such as with formulations XX compared to XXI, XXIV compared to XXV, and XXVI compared to XXVII, inclusion of benzotriazole may not confer better anticorrosive properties when used in combination with sodium and potassium citrate, and sodium chloride. Instead, it may result a formulation that is more corrosive and therefore use of a known anticorrosive chemical may have different effects based on the other components in the formulation. Without being limited to any theory, the overall effect may depend on the electrodynamic equilibrium established between the chemicals of a specific solution and the material.

Sodium EDTA, by itself, also confers anticorrosive properties to the formulations. Based on the mentioned above, the anti-corrosive contribution of this chemical, also known as a corrosion inhibitor, to the formulations.

The anticorrosive examples shown here do not constitute the totality of the cases found in this art, other anticorrosive formulations include the use of amino acids, tree hydroxybenzoic acids, dihydro benzoic acids, gluconic acid lactone, chlorhexidine di-gluconate, di and tree carboxylic acids, used by themselves or combined with benzotriazole and/or organic and inorganic salts of calcium and magnesium.

TABLE IX corrosion rate (CR) of different compositions of this art.

| | CR (mmY) | |
|---|---|---|
| Formula | Bare Al | Anodised Al |
| XX | 0.211 | 0.016 |
| XXI | 0.156 | 0.016 |

TABLE IX-continued corrosion rate (CR) of different compositions of this art.

| | CR (mmY) | |
|---|---|---|
| Formula | Bare Al | Anodised Al |
| XXII | 0.031 | 0.008 |
| XXIII | 0.156 | 0.023 |
| XXIV | 0.179 | 0.023 |
| XXV | 0.146 | 0.008 |
| XXVI | 0.267 | 0.039 |
| XXVII | 0.194 | 0.016 |
| XXVIII | 0.196 | 0.047 |
| XXIX | 0.132 | 0.008 |
| BSTZ | 0.891 | 0.085 |

Figure 5:
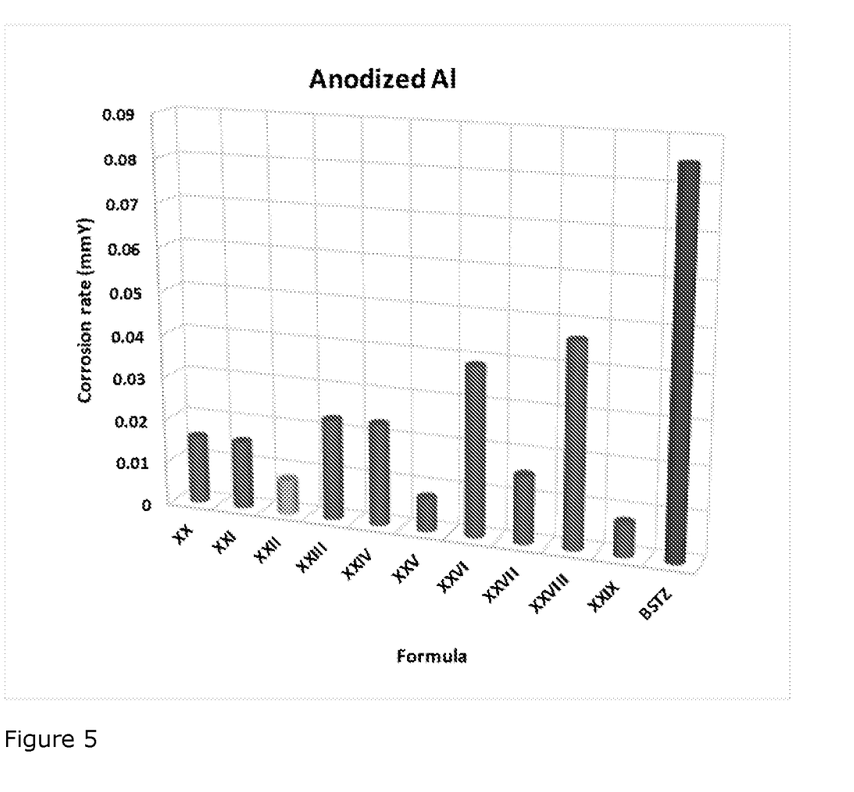
FIG. 5 is a graph showing corrosion rate of formulations described in Table VIII on anodized Aluminum.

When comparing the corrosion behavior of the examples presented in this art with BSTZ, on anodized aluminum, it is observed that all the examples of this art perform better than BSTZ, as observed in Table IX and FIG. 5. Formulations XXII, XXV and XXIX stand out compared to the rest of the compositions being noticeable that in the first case the combination magnesium nitrate-benzotriazole is needed to achieve a good performance of the formulation while in the two latter cases the presence of benzotriazole doesn't enhance the performance of the two organic salts. Instead, from formulations XXIV compared to XXV and XXVI compared to XXVII, it is observed that benzotriazole deprives the anticorrosive behavior of potassium citrate and sodium chloride, respectively. The effect of benzotriazole on corrosion of anodized aluminum also presents similar features to the one observed in the previous case with bare aluminum contradicting in both cases the common believe that benzotriazole is generally an anticorrosive material.

The embodiments shown in Table X demonstrate the ability to control the corrosion behavior of acids and hydrogen peroxide. It is observed that for fixed amounts of hydrogen peroxide and acids, the combination of benzotriazole with increasing amounts of magnesium nitrate reduces the corrosion rate of the formulations, either on bare aluminum or anodized aluminum.

Figure 6:
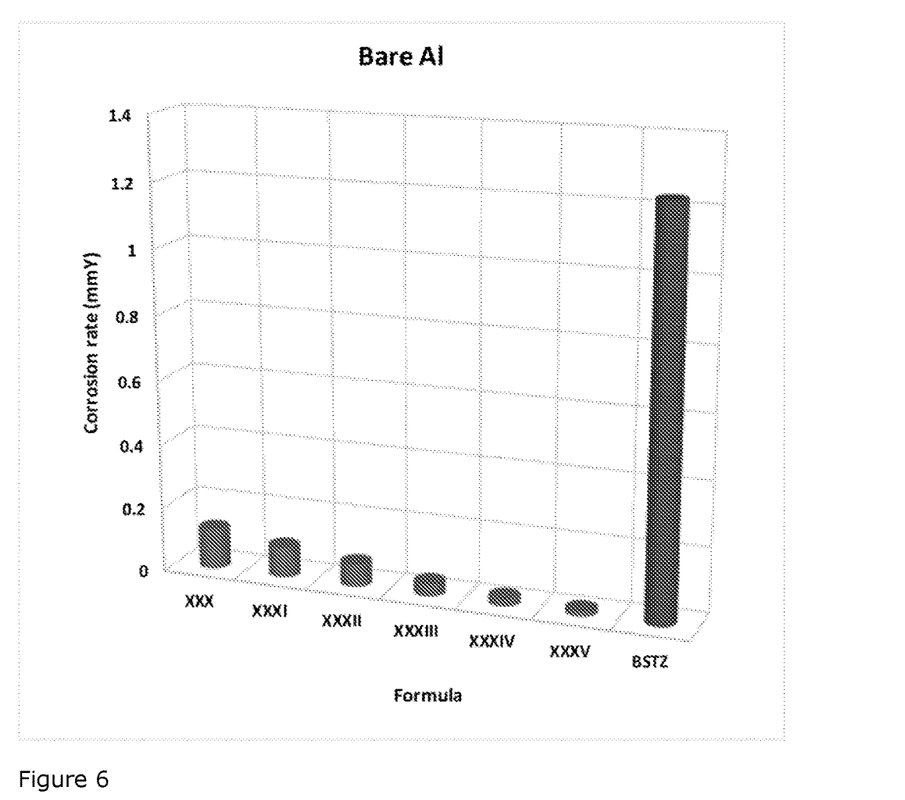
FIG. 6 is a graph showing corrosion rate of formulations described in Table X on bare Aluminum.
Figure 7:
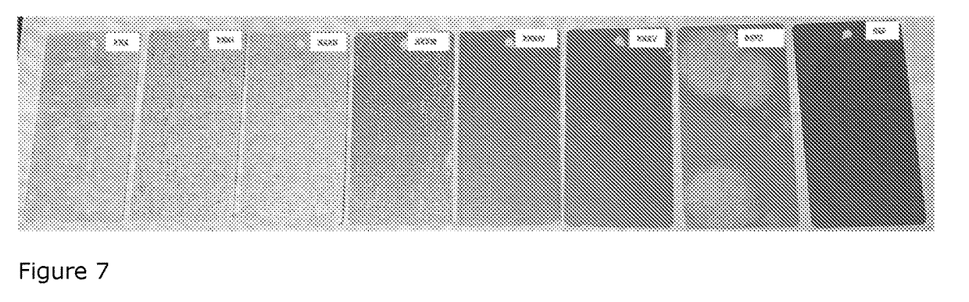
FIG. 7 shows bare aluminum coupons after 17 h of immersion test in the solutions described in Table X.

On bare aluminum, from Table XI and FIG. 6, it is noted that the corrosion rate of the compositions of this art are less corrosive compared to BSTZ by at least an order of magnitude. Visually, from the pictures in FIG. 7, it can be observed that BSTZ exhibit features of continuous (whitened coupons) and pitting corrosion (localized cavities in the coupon). Formulations XXX to XXXII also exhibit features of continuous corrosion which are gradually controlled as observed with Formulations XXXIII to XXXV.

Figure 8:
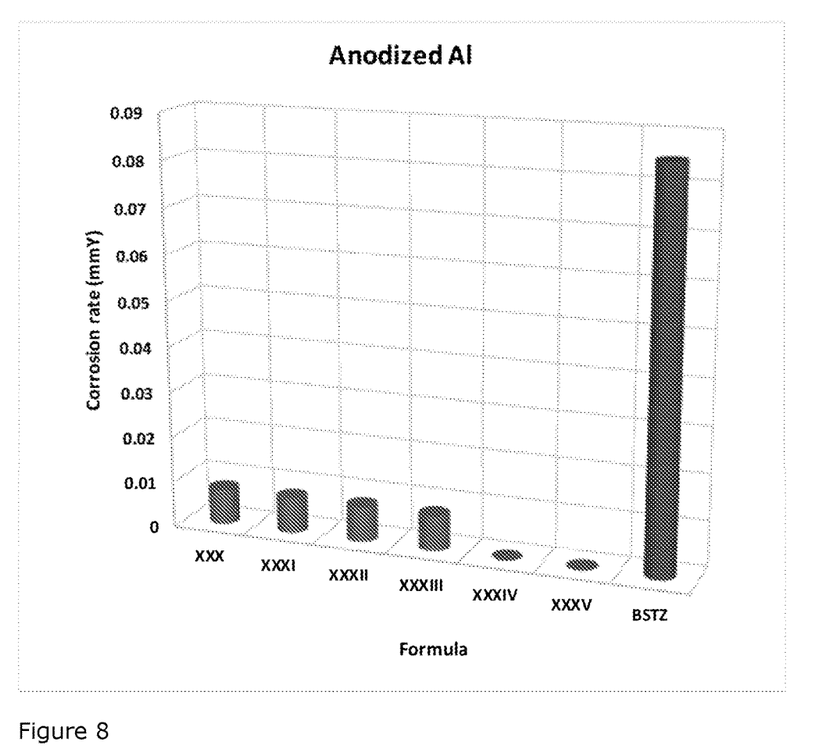
FIG. 8 is a graph showing corrosion rate of formulations described in Table X on anodized Aluminum.
Figure 9:
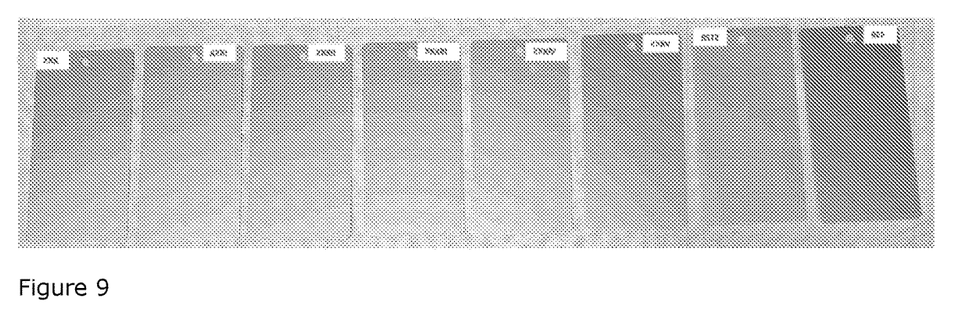
FIG. 9 shows anodized aluminum coupons after 17 h of immersion test in the solutions described in Table X.

Results of a similar study on anodized aluminum show that the corrosion behavior of the examples shown in this art are almost null as the corrosion rates produced by the weight difference of the coupons, before and after test, are in the order of the error of the detection capacity of the balance. The corrosion rate and appearance of the corrosion coupons subjected to this test, shown in FIGS. 8 and 9, show that all the formulations of this art perform better than BSTZ. TABLE X: Examples used to show the control of the corrosion behavior of the formulations of this art

|  | XXX | XXXI | XXXII | XXXIII | XXXIV | XXXV |
|---|---|---|---|---|---|---|
| A-PTM | 2.75 | 2.75 | 2.75 | 2.75 | 2.75 | 2.75 |
| Hydrogen Peroxide | 0.75 | 0.75 | 0.75 | 0.75 | 0.75 | 0.75 |
| Citric acid | 0.3 | 0.3 | 0.3 | 0.3 | 0.3 | 0.3 |
| Mandelic acid | 0.6 | 0.6 | 0.6 | 0.6 | 0.6 | 0.6 |
| Benzoic acid | 0.25 | 0.25 | 0.25 | 0.25 | 0.25 | 0.25 |
| 2-phenoxyethanol | 2.5 | 2.5 | 2.5 | 2.5 | 2.5 | 2.5 |
| Mg Nitrate | 0.05 | 0.1 | 0.15 | 0.2 | 0.25 | 0.3 |
| Benzotriazole | 0.15 | 0.15 | 0.15 | 0.15 | 0.15 | 0.15 |
| DI water | 92.65 | 92.6 | 92.55 | 92.5 | 92.45 | 92.4 |
| Total | 100 | 100 | 100 | 100 | 100 | 100 |

TABLE XI

Corrosion rate of examples with controlled anticorrosive behavior

| | CR (mmY) | |
|---|---|---|
| Formulation | Plain Al | Anodised Al |
| XXX | 0.124 | 0.008 |
| XXXI | 0.094 | 0.008 |
| XXXII | 0.070 | 0.008 |
| XXXIII | 0.039 | 0.008 |
| XXXIV | 0.023 | 0.000 |
| XXXV | 0.016 | 0.000 |
| BSTZ | 1.232 | 0.085 |

In one embodiment, the examples disclose isotropic micellar solutions made of renewable plant-derived surfactants used in the cosmetic industry, associated to other chemicals also used as preservatives in the cosmetic and food industry, can be turned into biodegradable non-toxic intermediate level disinfectants.

In particular, the compositions contain a micelle-forming biomimetic surfactant phospholipid of the type C8-C16 alkylpropyl PG-dimonium chloride phosphate, phenoxyethanol as antimicrobial adjuvant, and polyglyceryl caprylate as wetting agent.

The composition is mild enough to be regarded as "preservative-free" preservative composition was turned into a fast-acting disinfecting solution against bacteria and viruses via the introduction of low concentrations of hydrogen peroxide, in the range of 0.01 to 2.9%, 0.01 to 2% or more of phenoxyethanol (depending on the microorganism), 0.01 to 0.25% benzoic acid, and 0.01 to 1% mandelic acids as a synergistic mixture of antimicrobial agents, as observed in Tables IV and V, VI and VII.

The examples also show the need for a virucidal adjuvant consisting of a mixture of polycarboxylic acids and their sodium or magnesium salts, including aspartic acid, citric acid, glutaric acid, malic acid, The combination of antimicrobials with the mild preservative composition produced a disinfecting formulation effective as bactericidal, virucidal, fungicidal and tuberculocidal (against *M. terrae*) with contact times of 1 minute. In some embodiments, the present formulation can be as effective or even more effective as known hydrogen peroxide formulations and, in some embodiments, the present formulation allows for use of less hydrogen peroxide than other known formulations to achieve the same or even greater disinfecting effects.

According to one aspect, the fungicidal and bactericidal potency of the compositions of the present disclosure can be increased by increasing actives concentration of poorly water soluble components to levels not used before.

In certain aspects, the present invention has shown that improving the bactericidal activity of a formulation, beyond specific concentration of some components, can be detrimental to the virucidal activity. This demonstration is contrary to conventional expectations which would expect that improving the efficacy of a formulation against a type of microorganism also improves the efficacy against other microorganism. This fact also shows that the compositions of the present disclosure allows one to increase the potency against specific microorganisms offering the possibility to eventually design a formulation for resistant strains of microorganisms.

The micellar solutions of this present invention constitute an alternative to achieve both due to the nature of its constituents, the amounts of actives used, and the adjustable properties that can be obtained with micelles.

In one aspect, the micellar compositions are useful as endodontic irrigants since they are biocompatible, biodegradable and are derived from raw materials that are mostly biobased. As well, the nature of micelles allows modification of the formulations to produce desirable chemical, mechanical, and biological irrigant properties, including pH, suited for this application.

Within the embodiments, micellar structures can be produced with pHs closer to physiological pH range (7.35 to 7.45) to prevent tissue damage while still having significant biocide efficacy.

In one embodiment, bactericidal potency of the endodontic irrigants compositions of the present disclosure can be increased by increasing actives concentration of poorly water soluble components to levels not used before Within the embodiments, the endodontic irrigant compositions of the present disclosure can prevent or eliminates microorganism infection because the micellar compositions can be adjusted with desired chemical, mechanical and biocide activity while still being biocompatible due to the nature of the micellar structure components which can also act synergistically with reduced amounts.

Within the embodiments, micellar irrigants can be produced with adjusted rheological properties and wetting behavior to promote removal of necrotic tissue. Similarly, the surface tension of formulations can be adjusted so that the fluid can flow into inaccessible areas and remove debris.

Within the embodiments, micellar irrigants containing high hydrogen peroxide concentrations, around 3%, can be produced while still being noncorrosive or mildly corrosive to metallic surfaces.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

The embodiments of the present application described above are intended to be examples only. Those of skill in the art may effect alterations, modifications and variations to the particular embodiments without departing from the intended scope of the present application. In particular, features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole. Any quantities provided in the examples are provided for illustrative purposes only and are not intended to be limiting on the scope of the invention. The subject matter described herein and in the recited claims intends to cover and embrace all suitable changes in technology.

The invention claimed is:

1. A physically and chemically stable micellar composition for eliminating one or more of bacteria, fungi, and viruses from a surface, the composition comprises:
   a micelle;
   a phospholipid;
   a surfactant, consisting of a nonionic surfactant; hydrogen peroxide; and
   aromatic carboxylic acid and/or aromatic dicarboxylic acid; or tricarboxylic acid; and/or aromatic hydroxy carboxylic acid and/or aromatic dihydroxy; or trihydroxy mono or di carboxylic acid,
   wherein the composition eliminates one or more of bacteria, fungi, viruses from a surface within a contact time of less than 1 minute;
   wherein the micellar composition is physically and chemically stable and has a shelf life exceeding two years.

2. The composition according to claim 1 wherein a pH is from about 0.3 to 8.

3. The composition according to claim 1 wherein the phospholipid is alkyl amide propyl-propylene glycol-dimonium chloride phosphate; the nonionic surfactant is a polyglyceryl fatty acid ester or an alkyl (C5 to Cl 8) ethoxylate (4 to 16) surfactant or their polydisperse mixture, or alkylpolysaccharides or polyoxyethylene derivatives of sorbitan esters or a combination thereof.

4. The composition according to claim 3 wherein the phospholipid is in concentrations of about 0.3 to 10% w/w relative to the total weight of the micellar composition; the nonionic surfactant is in a concentration of from 0 to 10% w/w of the total weight of the micellar composition; the hydrogen peroxide is in a concentration of about 0.1 to 2.9% w/w relative to the total weight of the micellar composition; and/or the aromatic carboxylic acid and/or aromatic dicarboxylic or tricarboxylic acid, and/or aromatic hydroxy carboxylic acid, aromatic dihydroxy mono or di carboxylic acid is in a concentration of about 0.01 to 1% w/w relative to the total weight of the micellar composition.

5. The composition according to claim 1 wherein the phospholipid is Myristamidopropyl PG-Dimonium Chloride Phosphate, or Cocamidopropyl PG-Dimonium Chloride Phosphate, or Linoleamidopropyl PG-dimonium Chloride Phosphate or a combination thereof.

6. The composition according to claim 3 wherein the alkylpolysaccharides is D-Glucopyranose, or oligomeric, decyl-octyl glycoside and the polyoxyethylene derivatives of sorbitan esters is POE (20) sorbitan monopalmitate or POE (20) sorbitan monooleate; or the polyglyceryl fatty acid ester is polyglyceryl-10 caprylate/caprate, or polyglyceryl-4 laurate/sebacate and polyglyceryl-4 caprylate/caprate, or polyglyceryl-4 laurate/sebacate and polyglyceryl-6 caprylate/caprate or a combination thereof.

7. The composition according to claim 1 wherein the aromatic carboxylic acid is benzoic acid.

8. The composition according to claim 1 further comprising:
   a saturated alkyl mono, di, or tri hydroxy carboxylic acid; and/or
   an unsaturated alkyl dicarboxylic acid; and
      further comprising:
         an aromatic alpha hydroxy acid;
         an ortho, para or beta aminobenzoic acid;
         5-pyrrolidone-2-carboxylic acid;
         ascorbic acid;
         aspartic acid;
         praline;
         glycine;
         urea; and
      further comprising: an aromatic glycol ether;
         one anticorrosive;
         one organic salt;
         inorganic salts;
         inorganic salts; or
         a combinations thereof.

9. The composition according to claim 8 wherein the saturated alkyl mono, di, or tri hydroxy carboxylic acid in a concentration from about 0.01 to 5% w/w relative to the total weight of the micellar composition; wherein the aromatic alpha hydroxy acid, and/or ortho, para or beta aminobenzoic acid, and/or 5-pyrrolidone-2-carboxylic acid, and/or ascorbic acid, and/or aspartic acid, and/or praline and/or glycine and/or urea in a concentration of 0.01 to 3% w/w relative to the total weight of the micellar composition; wherein the at least an aromatic glycol ether is from 0.5 to 5% w/w relative to the total weight of the micellar composition; wherein the anticorrosive is in a concentration of from 0.01 to 1%; wherein the organic salt is in a concentration from of 0.01 to 2%.

10. The composition according to claim 8 wherein the aromatic glycol ether is phenoxyethanol; wherein the at least one anticorrosive is benzotriazole; wherein the organic salt is a salt of an alkali metal, a salt of an alkaline earth metal, the alkali metal comprising lithium, sodium, or potassium citrate, the alkaline earth metal comprising calcium or magnesium citrate, sodium or calcium benzoate, sodium EDTA, or magnesium acetate or a mixture of thereof; wherein the at least one organic salt is sodium citrate or functions as anticorrosive or chelant or PH adjuster or kosmotrophe, or a combination thereof; wherein the inorganic salt is a salt of an alkali metal, a salt of an alkaline earth metal, the alkali metal comprising lithium, sodium or potassium chloride, the alkaline earth metal comprising calcium or magnesium chloride, or magnesium nitrate or mixture thereof; wherein the inorganic salt is a salt of an alkali metal, a salt of an alkaline earth metal; and/or wherein the inorganic salt is lithium, sodium or potassium chloride, calcium or magnesium chloride, or magnesium nitrate or mixture thereof.

11. The composition according to claim 1 wherein the composition is formulated to solubilize poorly soluble disinfecting components; is formulated to solubilize very slightly soluble (0.1-1 mg/ml), slightly soluble (1-10 mg/ml), sparingly soluble (10-33 mg/ml), soluble (33-100 mg/ml), and/or freely soluble (100-1000 mg/ml) disinfecting components; and/or is formulated such that the micelle has a range of from about 4 to about 30 nm or from about 20 to about 50 nm.

12. The composition according to claim 1 wherein the surface is a non-porous surface or a porous surface.

13. The composition of claim 12 wherein the surface is a table or a tooth.

14. The composition according to claim 1 wherein a pH of the composition is from about 2 to 4.

15. A method to disinfect a surface from one or more of bacteria, fungi, viruses, the method comprising:
   applying the composition of claim 1 to the surface to disinfect the surface from one or more of bacteria, fungi, and viruses within a contact time on the surface of less than 1 minute.

16. A physically and chemically stable endodontic irrigant micellar composition for use in treating or eliminating bacteria and/or bacterial products within a root canal, the composition comprises:
   a. a micelle;
   b. a phospholipid;
   c. a nonionic surfactant;
   d. hydrogen peroxide; and
   e. aromatic carboxylic acid and/or aromatic dicarboxylic acid; or tricarboxylic acid; and/or aromatic hydroxy carboxylic acid and/or aromatic dihydroxy; or trihydroxy mono or di carboxylic acid,
   wherein the composition treats or eliminates bacteria from a root canal within a contact time of less than 1 minute.

17. The composition of claim 16 wherein a pH of the composition is from about 4 to about 8.

18. A method of disinfecting a root canal comprising contacting a tooth with the composition of claim 16.

19. A chemically and physically stable micellar composition for eliminating one or more of bacteria, fungi, and viruses from a surface, the composition comprises:
   a micelle;
   a phospholipid;
   a surfactant, consisting of a nonionic and non-phosphorus surfactant; hydrogen peroxide; and
   non-phosphate containing acids, the non-phosphate containing acids comprising:
      aromatic carboxylic acid;
      aromatic dicarboxylic or tricarboxylic acid;
      aromatic hydroxy carboxylic acid;
      aromatic dihydroxy, or trihydroxy mono or di carboxylic acid,
   wherein the composition eliminates one or more of bacteria, fungi, viruses from a surface within a contact time of less than 1 minute;
   wherein the micellar composition is physically and chemically stable and has a shelf life exceeding two years.

\* \* \* \* \*